Aug. 1, 1967  G. R. SHOCKLEY  3,333,317
METHOD FOR MAKING A HEAT EXCHANGER MEANS
Filed March 12, 1964  4 Sheets-Sheet 1

INVENTOR.
GILBERT R. SHOCKLEY
BY
HIS ATTORNEYS

INVENTOR.
GILBERT R. SHOCKLEY
BY Glenn Palmer
& Matthews
HIS ATTORNEYS

Aug. 1, 1967　　　　　　　　　G. R. SHOCKLEY　　　　　　　　3,333,317
METHOD FOR MAKING A HEAT EXCHANGER MEANS
Filed March 12, 1964　　　　　　　　　　　　　　　　　4 Sheets-Sheet 3

INVENTOR.
GILBERT R. SHOCKLEY
BY
Glenn, Palmer
& Matthews
HIS ATTORNEYS

Aug. 1, 1967  G. R. SHOCKLEY  3,333,317
METHOD FOR MAKING A HEAT EXCHANGER MEANS
Filed March 12, 1964  4 Sheets-Sheet 4

INVENTOR.
GILBERT R. SHOCKLEY
BY *Glenn, Palmer*
*& Matthews*
HIS ATTORNEYS

United States Patent Office 3,333,317
Patented Aug. 1, 1967

3,333,317
METHOD FOR MAKING A HEAT
EXCHANGER MEANS
Gilbert R. Shockley, Richmond, Va., assignor to Reynolds Metals Company, Richmond, Va., a corporation of Delaware
Filed Mar. 12, 1964, Ser. No. 351,504
1 Claim. (Cl. 29—157.3)

This invention relates to an improved evaporator means or the like as well as to an improved method and apparatus for making such an evaporator means or the like.

It is well known from the co-pending patent application, Ser. No. 332,818, filed Dec. 23, 1963, now Patent No. 3,294,162, and assigned to the same assignee as this application, that a heat exchanger tube can be provided by first forming a hollow tubular member having integral flange means outwardly directed therefrom and, thereafter, forming the flange means into a plurality of fins integral with the hollow tubular member to provide an effective and simple secondary heat exchanger surface means for the primary heat exchanger tubular member, the fins being formed in such a manner that each has a substantially increased surface area over the surface area of the part of the flange means from which the particular fin is being formed.

However, according to the teachings of this invention, improved means are provided for effectively forming such a heat exchanger tubular member into an evaporator or the like in a manner not taught or suggested by the aforementioned copending patent application.

Accordingly, it is an object of this invention to provide an improved evaporator means having one or more of the novel features of this invention as set forth above or hereinafter shown or described.

Another object of this invention is to provide an improved method for making such an evaporator means or the like.

A further object of this invention is to provide an improved apparatus for making such an evaporator means or the like.

Other objects, uses and advantages of this invention are apparent from a reading of this description which proceeds with reference to the accomapnying drawings having a part thereof and wherein.

Figure 2:
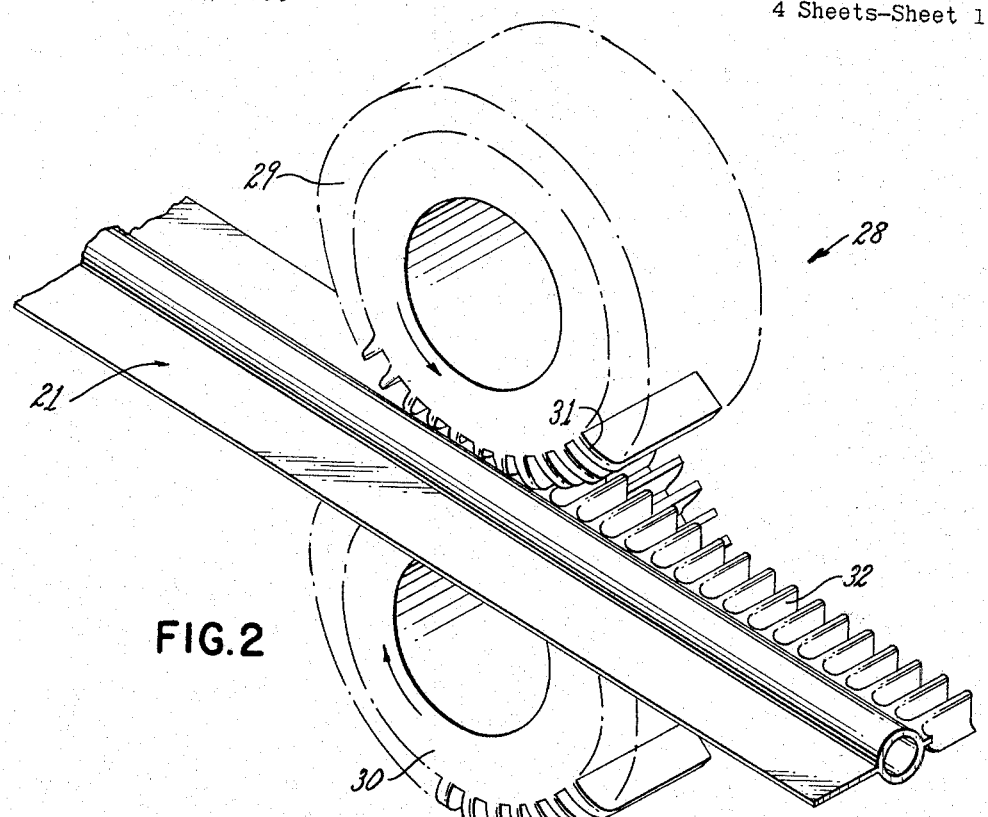
FIGURE 2 is a schematic perspective view illustrating one method of forming the finned parts of the heat exchanger blank of FIGURE 1.

While the various features of this invention are hereinafter described and illustrated as being particularly adaptable to provide an improved heat exchanger means or the like, it must be understood that the various features of his invention can be utilized singly or in any combination thereof to provide other constructions as desired.

Therefore, this invention is not to be limited to only the embodiments illustrated in the drawings because the drawings are merely utilized to illustrate one of the wide variety of uses of this invention.

Further, while this application refers to the final product as being an "evaporator means or the like" it is to be understood that such term is to include any type of heat exchanging apparatus or the like and is not to form a limitation on this invention.

Figure 8:
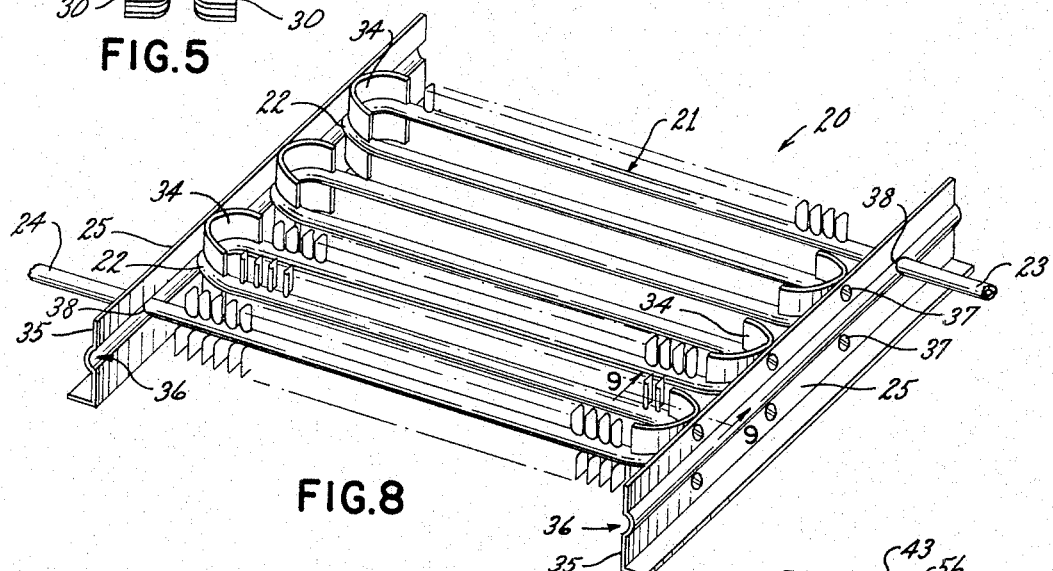
FIGURE 8 is a perspective view illustrating the completed evaporator means of this invention.

Referring now to FIGURE 8, an improved evaporator means of this invention is generally indicated by the reference numeral 20 and comprises a hollow tubular member 21 bent into a sinuous path to define opposed sets of elbows 22 thereof with the tube 21 having an inlet end 23 and an outlet end 24.

A pair of structural members or mounting brackets 25 are respectively secured to the elbows 22 of the hollow tubular member 21 at the opposed sets of elbows 22 thereof in a manner hereinafter described to provide a supporting structure for the evaporator means 20 for a purpose well known in the art.

The tubular member 21 of the evaporator means 20 has a plurality of outwardly directed fins 32 formed integrally with the tubular member 21 in a manner hereinafter set forth to provide secondary heat exchanger surface means for the hollow tubular member 21 for the reasons fully set forth in the aforementioned co-pending patent application.

The method and apparatus for forming the evaporator means 20 of this invention will now be described.

Figure 1:
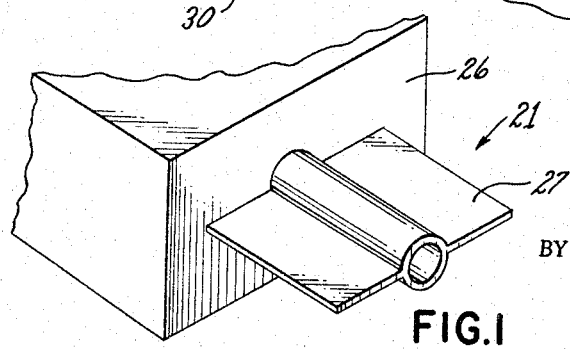
FIGURE 1 is a fragmentary perspective view illustrating one method for forming the heat exchanger blank of this invention.

As illustrated in FIGURE 1, the hollow tubular member 21 of this invention can be formed by extruding suitable metallic material, such as aluminum containing metallic material or the like, from a conventional extruding apparatus 26, the hollow tubular member 21 being formed with flange means 27 integral therewith and extending outwardly from opposed sides thereof whereby the flange means 27 extend throughout the entire length of the hollow tubular member 21.

However, it is to be understood that while two such flange means 27 are illustrated in FIGURE 1 and throughout the remaining figures of the drawings, the hollow tubular member 21 can be formed with one or any desired number of flange means 27 as will be apparent hereinafter.

In addition, while the hollow tubular member 21 is illustrated as being formed by an extrusion process, it is to be understood that the hollow tubular member 21 can be formed in any other desired manner, such as by the other methods set forth in the aforementioned co-pending patent application.

After a suitable length of the hollow tubular member 21 is formed in the above manner, the same is adapted to be passed through an apparatus 28 of this invention illustrated in FIGURE 2, the apparatus 28 including a pair of meshing gear means 29 and 30 respectively having a plurality of teeth 31 which mesh together and form the flange means 27 into a plurality of fins 32 in the manner fully set forth in the aforementioned co-pending patent application.

Figure 3:
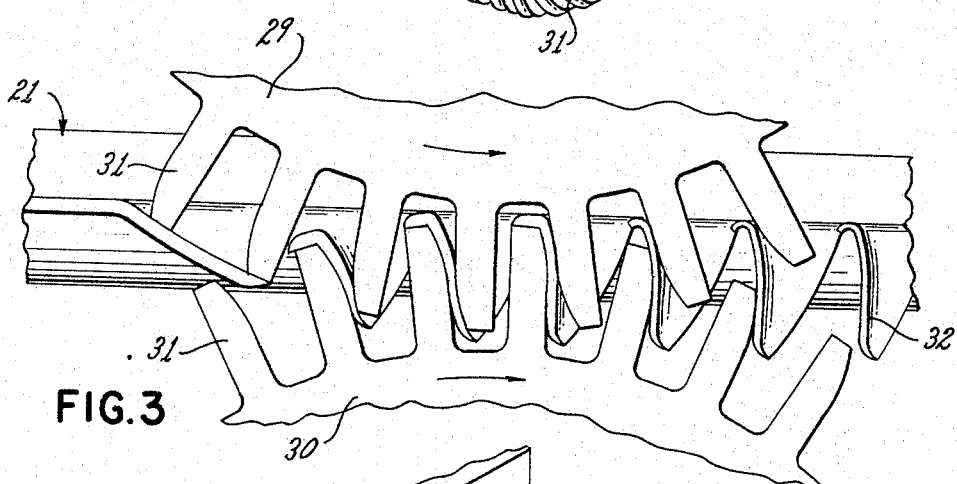
FIGURE 3 is an enlarged fragmentary side view illustrating the apparatus of FIGURE 2 forming the secondary fins on the heat exchanger tube of FIGURE 1.

In particular, reference is made to FIGURE 3 wherein the hollow tubular member 21 is being passed through the meshing gear means 29 and 30 from left to right whereby the teeth 31 on the gear means 29 cooperate with the teeth 31 on the gear means 30 to sever the flange means 27 into a plurality of parts and draw, iron and stretch those parts into the fins 32 which each has the surface area thereof substantially increased over the surface area of the part of the flange means 27 from which the particular fin 32 was formed, such drawing, stretching and ironing operation being fully evident from FIGURE 3.

Figure 5:
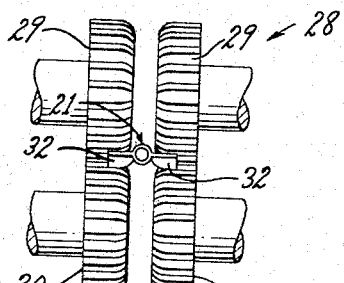
FIGURE 5 is an end view of the apparatus illustrated in FIGURE 4.

While the apparatus 28 is illustrated as merely having one pair of gear means 29 and 30 for operating on one flange means 27 of the hollow tubular member 21, it is to be understood that the apparatus 28 could be formed in the manner illustrated in FIGURE 5 wherein there are two pairs of opposed meshing gear means 29 and 30 adapted to respectively and simultaneously operate on the opposed flange means 27 of the hollow tubular member 21 as the same passes through the apparatus 28.

Figure 4:
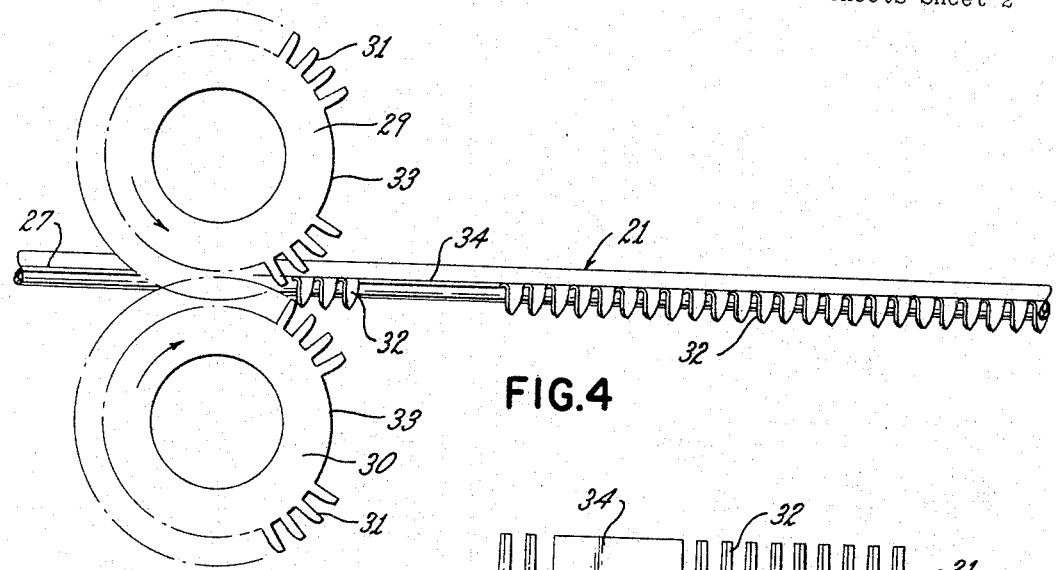
FIGURE 4 is a side view similar to FIGURE 3 and illustrates the improved method and apparatus of this invention.

However, it can be seen in FIGURE 4 that the gear means 29 and 30 respectively have toothless portions 33 so constructed and arranged that when the toothless portions 33 of the gear means 29 and 30 form the nip of the gear means 29 and 30, the gear means 29 and 30 do not effectively operate on the flange means 27 at the nip of the gear means 29 and 30 whereby an unfinned portion 34 of the hollow tubular member 21 is formed each time the toothless portions 33 of the gear means 29 and 30 cooperate together to form the nip of the gear means 29 and 30.

Figure 6:
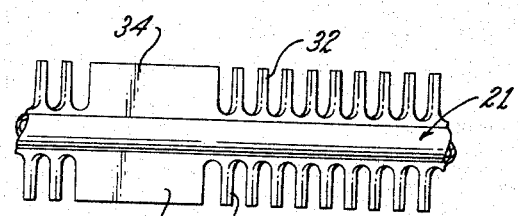
FIGURE 6 is a top view of the resulting heat exchanger tube taken from the apparatus of FIGURE 4.

Thus, as the hollow tubular member 21 is being continuously passed through the rotating and meshing gear means 29 and 30, it can be seen that periodically along the length of the issuing hollow tubular member 21, the flange means 27 thereof has unfinned portions 34 adjacent each other as illustrated in FIGURE 6 to provide mounting flange means in a manner hereinafter described while the remainder of the flange means 27 are formed into the fins 32 in the manner previously described by the gear teeth 31 of the gear means 29 and 30.

Figure 7:
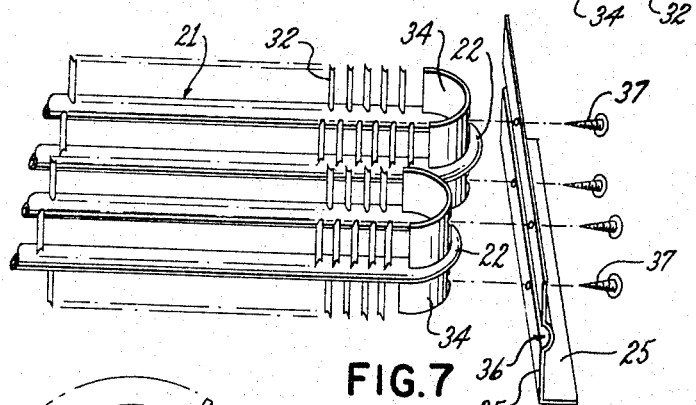
FIGURE 7 is a fragmentary perspective view illustrating the method of this invention for forming an evaporator or the like from the heat exchanger tube of FIGURE 6.

After the hollow tubular member 21 has been passed through the apparatus 28 to be shaped in the manner previously described, the same is adapted to be bent into the sinuous path illustrated in FIGURE 8 whereby the elbows 22 of the tubular member 21 are respectively formed at the mounting portions 34 of the flange means 27 in the manner illustrated in FIGURE 7, the portions 34 of the flange means 27 being formed into arcuate shapes as illustrated in FIGURE 7.

Thereafter, the rigidifying structural members or mounting brackets 25 are adapted to be secured to the mounting portions 34 of the flange means 27 to hold the elbows 22 of the bent tubular member 21 in the desired configuration thereof.

Figure 9:
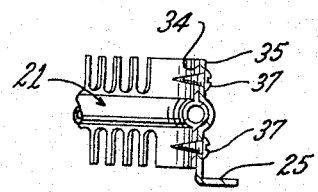
FIGURE 9 is a fragmentary cross-sectional view taken on line 9—9 of FIGURE 8.

In particular, each structural member 25 can comprise an L-shaped structure wherein one leg 35 of each structural member 25 has a longitudinal recess 36 provided therein and being adapted to receive part of the tubular member 21 at the elbows 22 thereof to permit the leg 35 to be disposed flush against the mounting portions 34 of the flange means 27 in the manner illustrated in FIGURE 9 so that suitable fastening members 37 can secure the leg 35 of the structural member 25 directly to the mounting portions 34 of the flange means 27 of the tubular member 21.

If desired, the mounting brackets or structural members 25 can have suitable openings 38 provided therein to respectively receive the inlet 23 and outlet 24 of the hollow tubular member 21 to complete the evaporator means 20 illustrated in FIGURE 8.

Therefore, it can be seen that the evaporator means 20 of this invention can be readily formed by the method and apparatus of this invention because the mounting portions 34 of the flange means 27 of the hollow tubular member 21 provide unique means for effectively coupling the structural members or mounting brackets 25 to the hollow tubular member 21 to hold the same in the desired configuration thereof for any desired purpose.

Another evaporator means of this invention is generally indicated by the reference numeral 39 in FIGURE 15 and comprises a hollow tubular member 40 bent in a sinuous path to define opposed sets of elbows 41 coupled together by a pair of structural members or mounting brackets 42 in a manner hereinafter described, the hollow tubular member 40 having a plurality of outwardly directed fins 43 formed integrally therewith in the manner previously described.

Figure 10:
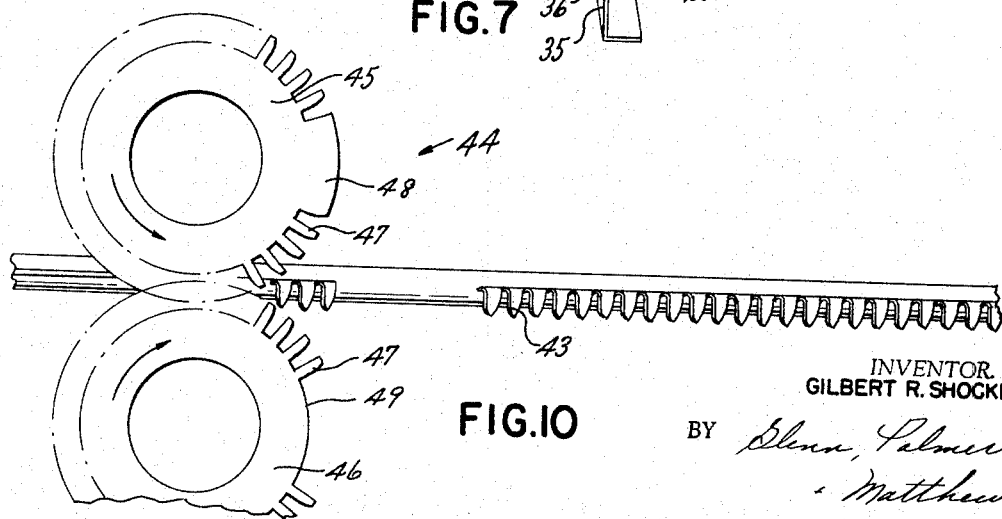
FIGURE 10 is a view similar to FIGURE 4 and illustrates another apparatus of this invention.

In particular, reference is made to FIGURE 10 wherein another apparatus of this invention is generally indicated by the reference numeral 44 and comprises a pair of rotating and meshing gear means 45 and 46 respectively having teeth 47 which mesh together to form the integral fins 43 in the manner previously described from the flange means 27 of the tubular member 21 of FIGURE 1.

However, the gear means 45 has a shearing part 48 which cooperates with a toothless part 49 of the gear means 46 to periodically shear off a portion of the flange means 27 as the same passes through the gear means 45 and 46 in the manner previously described.

Figure 11:
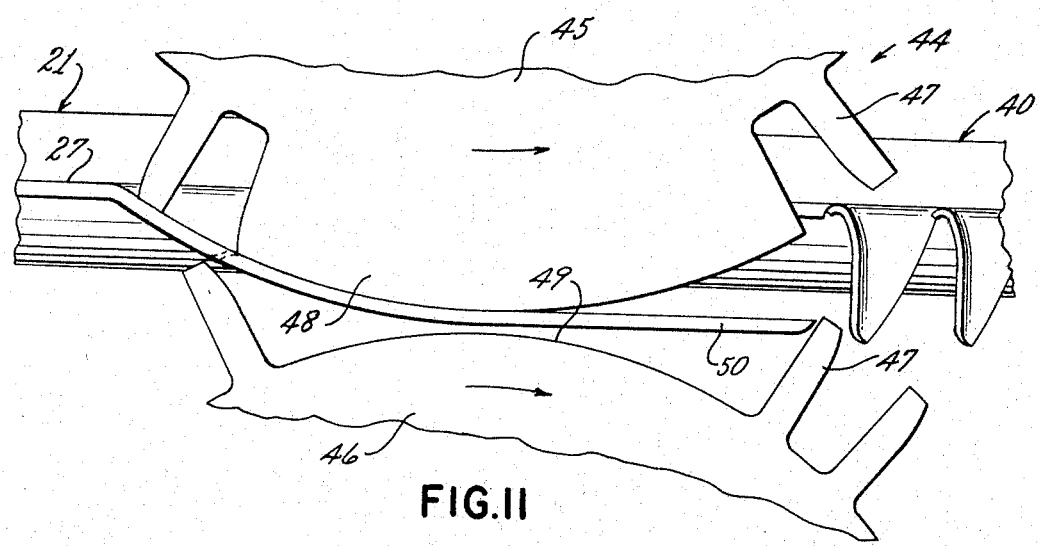
FIGURE 11 is an enlarged fragmentary side view of the apparatus illustrated in FIGURE 10.

In particular, it can readily be seen in FIGURE 11 that the shearing part 48 of the gear means 45 is adapted to shear the part 50 of the flange means 27 of the hollow tubular member 21 as the same is passed through the gear means 45 and 46 from left to right to form the hollow tubular member 40 issuing from the right side of the apparatus 44.

Figure 12:
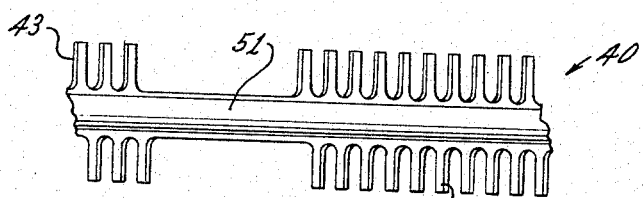
FIGURE 12 is a top view of the heat exchanger tube issuing from the apparatus of FIGURE 10.
Figure 13:
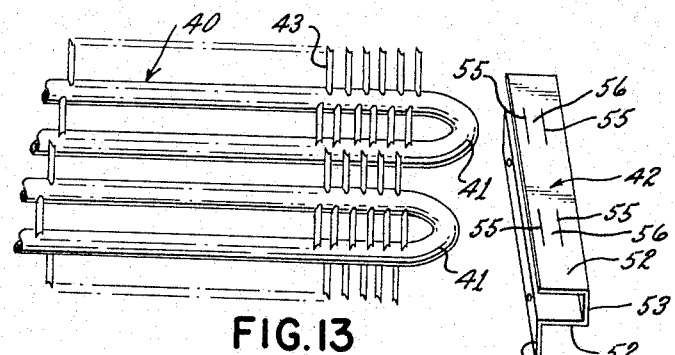
FIGURES 13 and 14 are fragmentary perspective views illustrating the method of forming an evaporator means from the heat exchanger tube of FIGURE 12.
Figure 14:
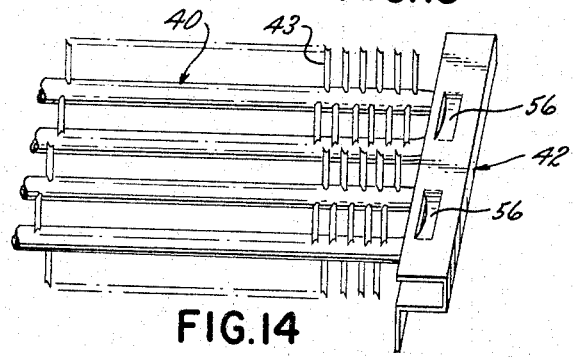

As illustrated in FIGURE 12, it can be seen that the apparatus 44 is adapted to produce the hollow tubular member 40 in such a manner that fins 43 are formed thereon from the flange means 27 and are separated from other sets of fins 43 by the unfinned portion 51 of the hollow tubular member 40.

Figure 15:
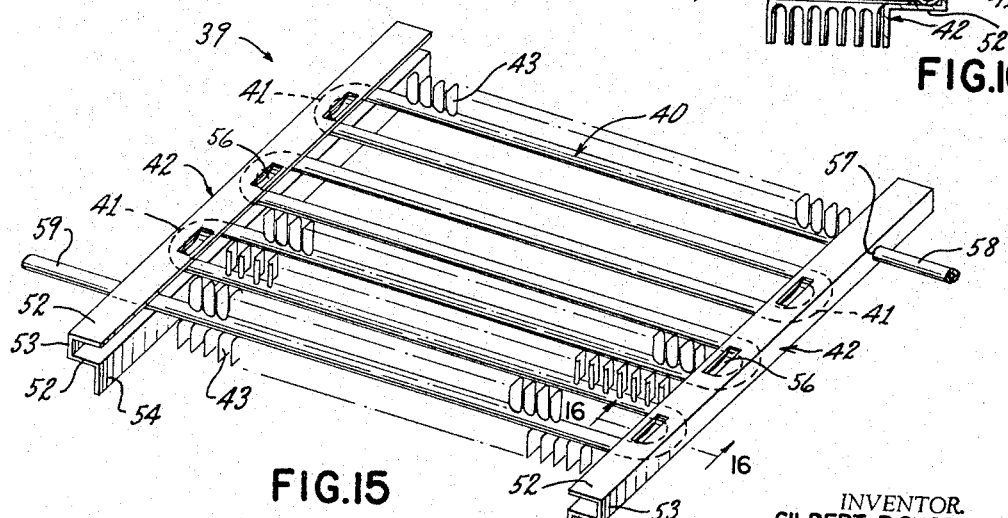
FIGURE 15 is a perspective view illustratingthe completed evaporator means of FIGURES 13 and 14.

Thereafter, the hollow tubular member 40 is formed into the sinuous paths illustrated in FIGURE 15 whereby the unfinned portions 51 of the hollow tubular member 40 form the elbows 41.

Subsequently, the structural members or mounting brackets 42 are adapted to be assembled to the bent unfinned portions 51 of the hollow tubular member 40 to complete the evaporator means 39. In particular, each structural member or mounting bracket 42 is substantially U-shaped as defined by a pair of legs 52 interconnected together by a cross member 53, the lower leg 52 having a depending flange 54 for permitting the particular structural member 45 to be secured to the desired supporting structure in any suitable manner.

The upper leg 52 of each structural member 55 has a plurality of pairs of slits 55 formed therein to define deformable strips 56 adapted to be disposed adjacent the elbows 41 of the bent hollow tubular member 40.

Figure 16:
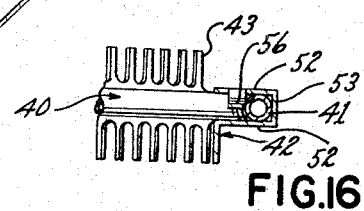
FIGURE 16 is a fragmentary cross-sectional view taken on line 16—16 of FIGURE 15.

In particular, each structural member 42 is adapted to receive the unfinned bent elbows 41 of the tubular member 40 between the legs 52 thereof in the manner illustrated in FIGURE 16 whereby the deformable strips 52 of the respective structural member 42 are adapted to be deformed downwardly in the manner illustrated in FIGURE 15 to positively couple the respective elbow 41 thereto in the manner illustrated in FIGURE 16.

Each structural member 42 can have a suitable opening 57 formed through the cross member 53 thereof to respectively receive an inlet 58 or outlet 59 of the hollow tubular member 40, the inlet 58 and outlet 59 being unfinned by having the flange 27 thereof removed by the shearing means 48 previously described.

Therefore, it can be seen that the evaporator means 39 of this invention can be formed in a simple and effective manner whereby the straight runs of the hollow tubular member 40 extending between adjacent opposed elbows 41 thereof respectively carry the outwardly directed integral fins 43 to provide the secondary heat exchanger surface means for the purpose fully set forth in the aforementioned co-pending patent application without requiring a time consuming fin removal process to provide the unfinned portions of the hollow tubular member 40.

Thus, not only does this invention provide an improved evaporator means having many unique features and advantages, but also this invention provides an improved method and apparatus for making such an evaporator means or the like.

While the form of the invention now preferred has been disclosed as required by the statutes, other forms may be used, all coming within the scope of the claim which follows.

What is claimed is:

A method for making an evaporator or the like comprising the steps of providing a hollow tubular member having integral flange means extending outwardly from said tubular member, removing a part of said flange means adjacent a portion of said tubular member, bending said tubular member to define a substantially U-shaped elbow thereof with said portion thereof, providing a frame member having an outwardly directed channel defined between two leg means, disposing said elbow in said channel between said leg means, and securing said frame member to said elbow by deforming a portion of said leg means into the space between the legs of said U-shaped elbow, said securing step including the steps of forming spaced apart slits in one of said leg means to define a strip integrally interconnected to said one leg means at the opposed ends of said strip, and inwardly deforming said strip toward said other leg means to be received in the space between the legs of the U-shaped elbow.

References Cited
UNITED STATES PATENTS

| | | |
|---|---|---|
| 2,286,271 | 6/1942 | Higham. |
| 2,294,030 | 8/1942 | Higham. |
| 2,347,957 | 5/1944 | McCullough. |
| 2,553,142 | 5/1951 | McCreary _____ 29—157.3 |
| 2,688,794 | 9/1954 | Malutich _____ 29—157.3 |
| 2,692,119 | 10/1954 | Morse _____ 165—150 |
| 2,792,201 | 5/1957 | Whistler. |
| 2,963,779 | 12/1960 | Mosgard-Jenson ____ 29—157.3 |

JOHN F. CAMPBELL, *Primary Examiner.*

J. D. HOBART, *Assistant Examiner.*